United States Patent
Vacher

(10) Patent No.: US 7,592,952 B2
(45) Date of Patent: Sep. 22, 2009

(54) METHOD OF LOCATING A VEHICLE FROM SATELLITE DATA

(75) Inventor: Charlie Vacher, Paris (FR)

(73) Assignee: Sagem Defense Securite, Paris (FR)

( * ) Notice: Subject to any disclaimer, the term of this patent is extended or adjusted under 35 U.S.C. 154(b) by 74 days.

(21) Appl. No.: 11/905,944

(22) Filed: Oct. 5, 2007

(65) Prior Publication Data

US 2008/0084348 A1    Apr. 10, 2008

(30) Foreign Application Priority Data

Oct. 9, 2006    (FR)    ................................... 06 08828

(51) Int. Cl.
*G01S 1/00* (2006.01)
*G01S 5/14* (2006.01)
(52) U.S. Cl. ............................ 342/357.06; 342/357.02; 342/357.03
(58) Field of Classification Search .................
342/357.02–357.03, 357.06
See application file for complete search history.

(56) References Cited

U.S. PATENT DOCUMENTS

2001/0020214 A1 *   9/2001   Brenner ...................... 701/213

2003/0021222 A1 *   1/2003   Boer et al. .................. 370/216
2003/0117317 A1    6/2003   Vanderwerf et al.

FOREIGN PATENT DOCUMENTS

FR    2 866 423 A1    8/2005

OTHER PUBLICATIONS

Brenner, M.: "Integrated GPS/Inertial Fault Detection Availability" Navigation: Journal of the Institute of Navigation. vol. 43, No. 2, 1996 pp. 111-130.
Escher, A. et al: "GNSS/IRS Hybridization: Fault Detection and Isolation of More than One Ranger Failure" Proceedings of Ion GPS 2002, Sep. 24, 2002, pp. 2619-2629.

* cited by examiner

*Primary Examiner*—Thomas H Tarcza
*Assistant Examiner*—Harry Liu
(74) *Attorney, Agent, or Firm*—Muncy, Geissler, Olds & Lowe, PLLC

(57) ABSTRACT

A method of locating a moving element by determining a reference position and at least one overall protection limit on the basis of data from a group of satellites in a constellation of satellites. The method comprises the steps of selecting from the group of satellites a subgroup comprising at least five satellites, calculating positions from the data from the group and from the data from the subgroup, and calculating corresponding protection limits while distinguishing whether the failure in the constellation does or does not affect the satellites under consideration.

4 Claims, 2 Drawing Sheets

METHOD OF LOCATING A VEHICLE FROM SATELLITE DATA

The present invention relates to a method of locating a vehicle from satellite data. The method can be implemented in particular in the global positioning system known under the acronym "GPS".

BACKGROUND OF THE INVENTION

Conventionally, a vehicle, such as an aircraft, is located on the basis firstly of data provided by an on-board measurement unit (e.g. including an inertial unit and a barometric altimeter), and secondly from satellite data coming from a constellation of satellites in orbit around the Earth. Combined processing of this data makes it possible to obtain a position that is accurate, referred to below as the "reference" position, and that is close to the real position of the aircraft. The accuracy of the reference position is nevertheless very sensitive to a failure in the constellation of satellites, i.e. in the event of a satellite failing in such a manner as to transmit data that is not exact, but without the failure being detected, or in the event of simultaneous or consecutive failures of two satellites in the constellation (the risk of three satellites failing simultaneously is so low that it is generally ignored).

That is why it is usual practice to provide the pilot of the aircraft with a volume known as the "protection" volume and referred to below as the overall protection volume, that is centered on reference position and that is representative of the accuracy of the reference position, taking account of the risk of one or two satellites failing. The overall protection volume is a cylinder of vertical axis defined by its radius and its height that are usually referred to as HPL and VPL. Even if the real position of the aircraft does not coincide exactly with the reference position, it nevertheless has a probability of lying outside the overall protection volume that is equal to no more than some acceptable safety threshold (or integrity risk threshold).

The protection volume corresponding to each circumstance is calculated on the basis of the statistical distribution of position error. Calculating the overall protection volume assumes that it is possible to define the integrity risk by taking account of the probabilities of no failure, of the occurrence of one failure, and of the occurrence of two failures, and to determine the overall protection volume in such a manner that the integrity risk is at least equal to the probability of that the real position lies within the overall protection volume.

In the event of no failure, determining the statistical distribution, and thus calculating the protection volume, does not raise any problem. The position error distribution function is known and it is then possible to estimate the corresponding standard deviation. This estimate is valid only on the assumption that the position has been calculated without using any erroneous data.

The event of one satellite failing is more awkward, since it is not possible to determine validly the statistical distribution of the position error on any position that is affected by a failure of a satellite, however it is possible to escape from this difficulty by calculating as many secondary positions as there are satellites and by excluding from the calculation of each of the secondary positions, data provided by a respective one of the satellites so that at least one of the secondary positions is not affected by the failure of a satellite. The secondary position and the corresponding secondary protection volume giving the greatest overall protection volume is then retained.

The circumstance of two satellites failing requires considerable computation power and is generally ignored, on the view that the probability of it occurring is too low to justify taking it into account.

Document US-A-2004/239560 describes such a method of calculating the overall protection volume.

Attempts have also been made to find means that enable the two-failure circumstance to be made negligible. It is thus known to make use of an algorithm for detecting and isolating failures, thereby minimizing the risk that a simultaneous failure of two satellites goes undetected, and thus making it possible to ignore the possibility of simultaneous failure when calculating the protection volume. Nevertheless, such an algorithm requires a large amount of computation power on board the aircraft and lengthens the time taken to process the data. In addition, the method requires appropriate validation methodology that is difficult to put into place insofar as the performance of the algorithm for detecting and isolating failures has a direct bearing on the safety (or integrity) of the airplane, given that a failure that is not detected jeopardizes the safety of the aircraft.

OBJECT OF THE INVENTION

It would therefore be advantageous to have means enabling the protection volume to be calculated in a manner that is reliable, while limiting the computer resources needed for performing the calculation and the validation efforts that are required.

SUMMARY OF THE INVENTION

To this end, the invention provides a method of locating a moving element by determining a reference position and at least one overall protection limit from data from a group of satellites in a constellation of satellites, the overall protection limit calculation comprising the step of calculating protection limits as a function of probabilities for the absence of failure in the constellation of satellites, and of failure in the constellation of satellites, the method comprising the steps of:

from the group of satellites, selecting a subgroup comprising at least five satellites;
  calculating a main position from the data from a group of satellites;
  calculating secondary positions from the data from a subgroup of satellites by excluding date from one of the satellites when calculating each secondary position;
  calculating protection limits corresponding to the main and secondary positions while distinguishing whether the failure in the constellation does or does not affect the satellites taken into consideration; and
  calculating the overall protection limit from the reference position, the main position, the secondary positions, and the protection limits corresponding to the main and secondary positions.

By selecting a subgroup from the group of satellite data items, it is possible to simplify and optimize the calculations by introducing the possibility of selecting satellites to make up the subgroup.

According to a first advantageous characteristic:

for each failure of a data-supplying satellite of the group but not of the subgroup, the corresponding protection limit is calculated on one of the secondary positions;
  for failure of one data-supplying satellite of the subgroup, a corresponding protection limit is calculated on each secondary position;

for failure of two data-providing satellites of the group but not of the subgroup, the protection limit is calculated on one of the secondary positions; and for failure of a data-supplying satellite of the group but not of the subgroup, and of a data-supplying satellite of the subgroup, a corresponding protection limit is calculated on each secondary position;

whereby failure of two data-supplying satellites of the subgroup is made negligible.

The possibility of two satellites failing is taken into account and is made negligible on the assumption of two satellites failing that supply data to the subgroup.

According to a second advantageous characteristic, the method comprises the steps of calculating an additional secondary position from the subgroup of satellite, for failure of a data-supplying satellite of the group but not of the subgroup, the corresponding protection limit is calculated on the additional secondary position; and for failure of two data-supplying satellites of the group but not of the subgroup, the protection limit is calculated on the additional secondary position.

According to a third advantageous characteristic, the horizontal and vertical protection limits are calculated, the method comprising steps of selecting two different subgroups for calculating the horizontal and vertical protection limits.

It is thus possible to elect the satellite data best adapted to calculating the vertical protection limit and the horizontal protection limit as a function in particular of the height of the satellites and their mutual spacings.

Other characteristics and advantages of the invention appear on reading the following description of a particular, non-limiting implementation of the invention.

BRIEF DESCRIPTION OF THE DRAWINGS

Reference is made to the accompanying drawings, in which.

DETAILED DESCRIPTION OF THE INVENTION

Figure 1:
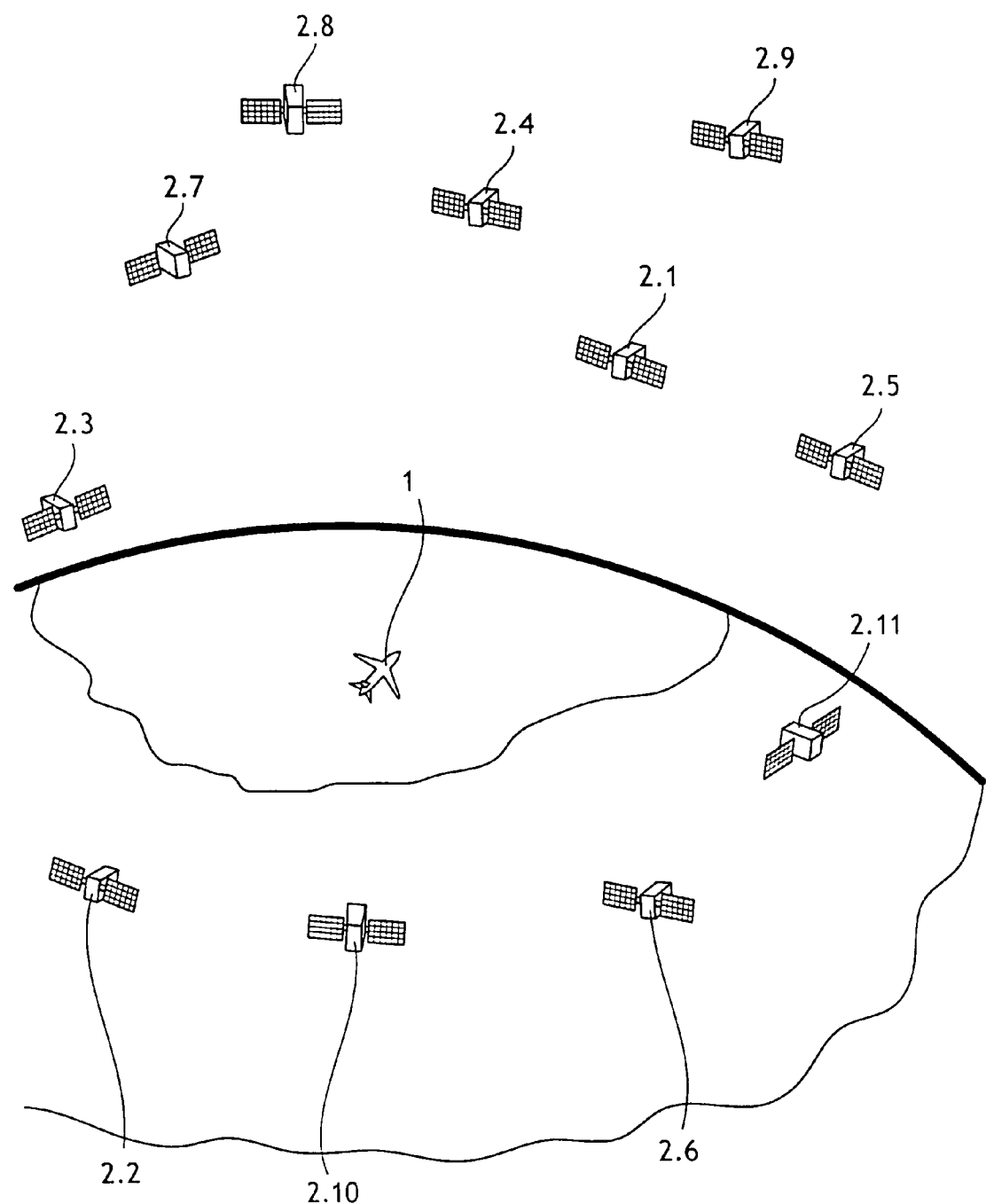
FIG. 1 is a diagrammatic representation of a constellation of satellites present above the horizon of an aircraft.
Figure 2:
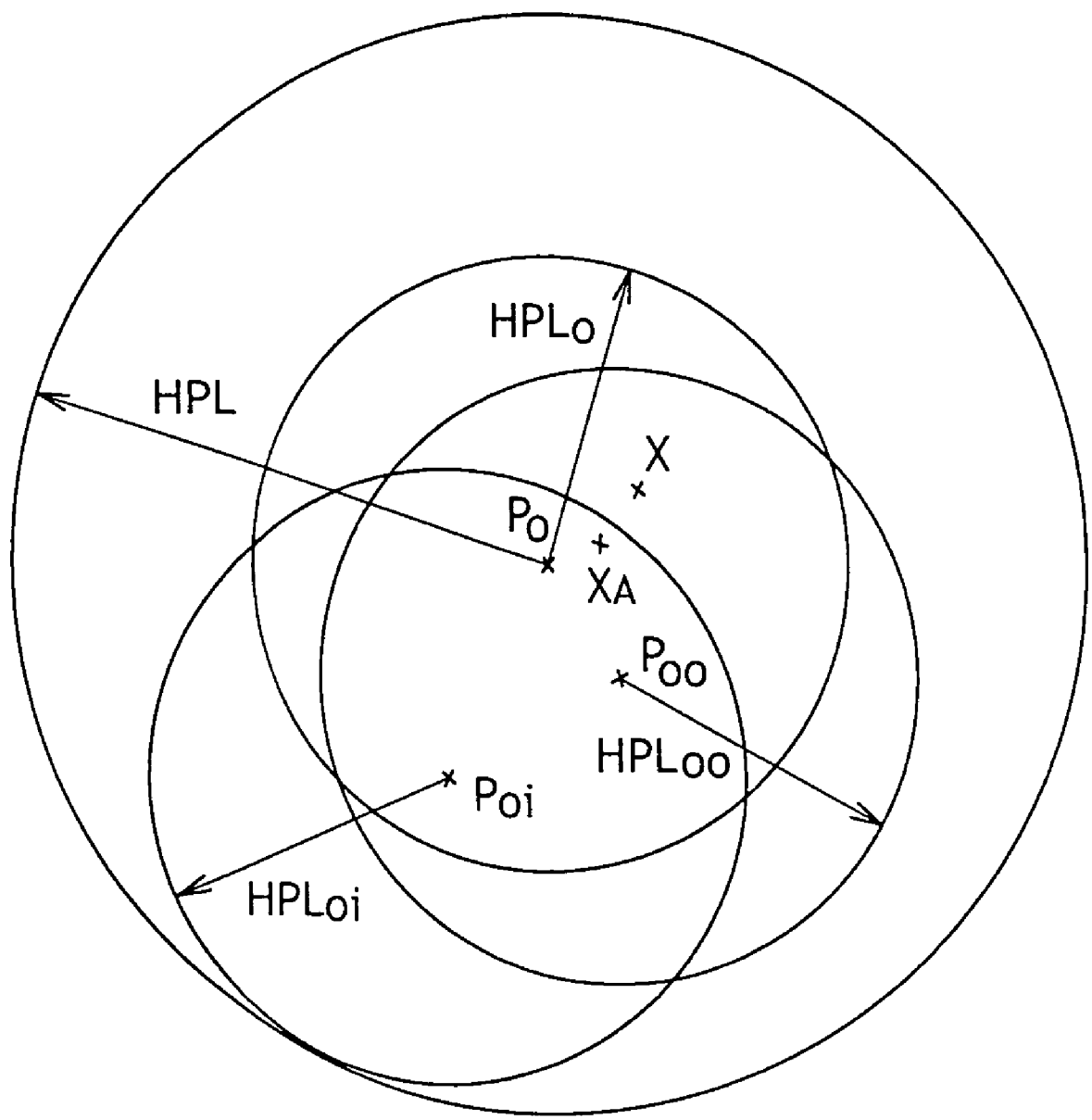
FIG. 2 is a diagrammatic view showing the positions and the protection limits calculated for locating the aircraft.

With reference to the figures, the method of the invention is described below for an aircraft 1 having an on-board navigation system using data coming from N satellites 2.*i* (where i varies over the range 1 to N, i.e. 2.1, 2.2, 2.3, 2.4, 2.5, 2.6, 2.7, 2.8, 2.9, 2.10, 2.11, in FIG. 1), the satellites orbiting around the Earth 100, and also from data coming an inertial unit on board the aircraft 1.

The inertial unit is itself known and responds to sensors secured to the aircraft 1 to deliver data relating in particular to the attitude of the aircraft 1, its speed, . . . .

The satellites 2.1 to 2.11 form part of a set of satellites that are in orbit around the Earth and that belong to a satellite navigation system of the GPS type. Each satellite 2.*i* continuously transmits a signal giving its location and the exact time at which the signal was transmitted. The N satellites 2.*i* thus transmit N signals at regular intervals, the signals being referred to be below as satellite data.

In known manner, the navigation system comprises a calculation unit connected to an inertial navigation unit and to a receiver for receiving the signals from the satellites. In conventional manner, the calculation unit incorporates processors and memories enabling it to calculate a pseudorange separating the aircraft 1 from each satellite 2.*i* from which a signal has been received by the receiver, and for merging the pseudoranges and data coming from the inertial navigation unit in order to determine, amongst other things, a position for the aircraft 1.

The merging is performed in a manner that is itself known by using Kalman filters or any other algorithm enabling data to be merged.

The navigation system thus uses a reference filter to provide an accurate position $X_A$ or reference position on the basis of inertial data and of satellite data. The precise position $X_A$ is defined for a horizontal component (here a latitude and a longitude) and a vertical component (here an altitude).

The system also provides an overall protection volume defined by an overall horizontal protection limit HPL and an overall vertical protection limit VPL calculated from the satellite data.

The overall protection volume must be as small as possible and it is determined so that if the real position X of the aircraft does not coincide exactly with its calculated position, then the real position has a probability of lying outside the overall protection volume that is at most equal to some acceptable safety threshold. The operations for calculating the overall horizontal protection limit are specified below. The operations for calculating the overall vertical protection limit are similar.

The protection limits are calculated in a manner that is itself known on the basis of the statistical distribution of the error on the calculated position (Gaussian distribution for the vertical component of the position, and $\chi^2$ distribution for the horizontal component of the position).

By way of example, for the horizontal protection limit HPL, the following can be written:

$$P(He \geq HPL) \leq P_{ir}$$

where He is the horizontal position error and $P_{ir}$ is the acceptable safety threshold, also referred to as the integrity risk. This integrity risk must not be exceeded even in the event of one or two of the satellites of the constellation breaking down. The probability of three satellites of the constellation breaking down is $10^{-12}$, and is ignored. By way of example, for the horizontal protection limit HPL, the following applies:

$$(He \geq HPL) = P(He \geq HPL, 0 \text{ failure}) \times P(0 \text{ failure}) + P(He \geq HPL, 1 \text{ failure}) \times P(1 \text{ failure}) + P(He \geq HPL, 2 \text{ failures}) \times P(2 \text{ failures}) \quad (1)$$

By way of explanation, $P(He \geq HPL, 0 \text{ failure})$ means "the probability that He is greater than or equal to HPL in the absence of failure", and P(1 failure) means "probability of one failure occurring".

The integrity risk is likewise resolved as a function of these various cases:

$$P_{ir} = K_1 P_{ir} + K_2 P_{ir} + K_3 P_{ir}$$

where the coefficients $K_1$, $K_2$, and $K_3$ correspond respectively to the cases of no failure, the presence of one failure, and the presence of two failures.

It is not possible to determine a protection limit validly in the event of the position in question being calculated on the basis of erroneous data from at least one satellite. It is then necessary to return to a position for which the calculation does not suffer from any error.

In order to determine the overall protection volume, the system also uses a main filter to calculate a main position $X_0$ that is said to be reliable on the basis of the data from N satellites.

In the invention, provision is also made for the system to select data from a subgroup of n satellites taken from the group of N satellites in order to calculate, by means of a secondary filter, a secondary position $X_{00}$ or "first secondary position" The data from the n satellites is selected as a function of its pertinence for determining the horizontal component of the position (data coming from satellites that are the furthest apart is thus retained) or for determining the vertical component of the position (data coming from the highest satellites is then retained). By way of example, the pertinence of the satellites is determined by the direction cosine method, by calculating the dilution of precision (DOP) for the n possible constellations of n−1 satellites, and by conserving the satellites that come from constellations having the smallest DOP.

Provision is then made to use n−1 secondary filters to calculate n−1 additional secondary positions or "second secondary positions" $X_{0i}$ (for i varying from 1 to n) while excluding the data from satellite $2.i$ in order to calculate each secondary position.

Protection limits are then calculated on the assumption that there is no satellite failure, on the assumption that there is one satellite failure, and on the assumption that there are two satellite failures.

By way of example, in the description below, the horizontal protection HPL is calculated.

When there is no satellite failure, all of the satellite data is good. The protection limit is calculated on the main position $X_0$ calculated using data from the N satellites. The probability that none of the data is affected by a failure is $(1-N) \times 10^{-5}$ per hour.

Consequently the following applies:

$$P(He \geq HPL, 0 \text{ failure}) \times (1-N) \times 10^{-5} \geq K_1 P_{ir} \quad (2)$$

$$\text{i.e. } P(He \geq HPL, 0 \text{ failure}) = K_1 \frac{P_{ir}}{(1-N) \times 10^{-5}}$$

When one satellite has failed in the group of N satellites, it is necessary to distinguish two possibilities, depending on whether:

- the failing satellite belongs to the subgroup, in which case the protection limit is determined on each secondary position $X_{0i}$ (one of which is good since it is calculated without making use of data from the failing satellite); or
- the failing satellite does not belong to the subgroup, in which case the protection limit is determined on the secondary position $X_{00}$ for which calculation is affected by the failure (whereas the position $X_0$ is likely to be wrong).

Under such circumstances:

$$K_2 P_{ir} = P(He \geq HPL, 1 \text{ failure in n}) \times P(1 \text{ failure in n}) + P(He \geq HPL, 1 \text{ failure not in n}) \times P(1 \text{ failure not in n}) \quad (3)$$

It is decided to spread the integrity risk in equally probable manner between the two possibilities.

This gives:

$$P(He \geq HPL, 1 \text{ failure in } \underline{n}) = k_2 \frac{P_{ir}}{2n \times 10^{-5}} \quad (4)$$

$$P(He \geq HPL, 1 \text{ failure in } \underline{n}) = k_2 \frac{P_{ir}}{2(N-n) \times 10^{-5}} \quad (5)$$

When two satellites fail, it is necessary to distinguish three possibilities depending on whether:

- the failing satellites belong to the subgroup, in which case all of the calculated positions are wrong;
- one of the failing satellites belongs to the subgroup and the other does not belong thereto, in which case the protection limit is determined on each secondary position $X_{0i}$ (one of which was calculated without making use of data from a failing satellite); or
- the failing satellites do not belong to the subgroup, in which case the protection limit is determined on the secondary position $X_{00}$ for which the calculation has not been affected by a failure (whereas the primary position $X_0$ is likely to be wrong).

The probability of two breakdowns affecting data from satellites during a mission of T hours is $T \times N^2 \times 10^{-10}$.

This gives:

$$K_3 P_{ir} = P(He \geq HPL, 2 \text{ failures in n}) \times P(2 \text{ failures in n}) \times P(He \geq HPL, 1 \text{ failure in n and 1 not in n}) \times P(1 \text{ failure in n}) \times P(1 \text{ failure not in n}) + P(He \geq HPL, 2 \text{ failures not in n}) \times P(2 \text{ failures not in n}) \quad (6)$$

The portion of equation (6) concerned by the first possibility is:

$$P(He \geq HPL \text{ for 2 failures in n}) \times P(2 \text{ failures in n})$$
$$\text{where } P(2 \text{ failures in n}) = T \times n^2 \times 10^{-10}. \quad (7)$$

Since the protection limit cannot be calculated under such circumstances, given that all of the positions are wrong, it is decided to give the value 1 to the probability that position error is greater than the protection limit when two data-supplying satellites in the subgroup have failed. This circumstance is therefore not ignored, but on the contrary taken into account by giving it the most unfavorable probability.

Equation (6) then becomes:

$$K_3 P_{ir} - T \times n^2 \times 10^{-10} = P(He \geq HPL, 1 \text{ failure in n and 1 failure not in n}) \times P(1 \text{ failure in n}) \times P(1 \text{ failure not in n}) + P(He \geq HPL, 2 \text{ failures not in n}) \times P(2 \text{ failures not in n}) \quad (8)$$

It is decided to spread the remaining integrity risk, i.e. $K_3 P_{IR} - T \times n^2 \times 10^{-10}$ in equiprobable manner between the second and third possibilities.

Thus for the second possibility:

$$\frac{K_3 P_{ir} - T n^2 \times 10^{-10}}{2} = \quad (9)$$
$$P(He \geq HPL, 1 \text{ failure in } \underline{n} \text{ and 1 failure not in } \underline{n}) \times$$
$$P(1 \text{ failure in } \underline{n}) \times P(1 \text{ failure not in } \underline{n})$$

$P(He \geq HPL, 1 \text{ failure in n and 1 failure not in n}) \times P(1 \text{ failure in n}) \times P(1 \text{ failure not in n})$ with the product of $P(1 \text{ failure in n})$ and $P(1 \text{ failure not in n})$ being equal to $T \times 10^{-10} \times n(N-n)$ giving:

$$P(He \geq HPL, 1 \text{ failure in n and 1 failure not in n}) \quad (10)$$

$$P(He \geq HPL, 1 \text{ failure in } \underline{n} \text{ and 1 failure not in } \underline{n}) = \quad (10)$$
$$\frac{K_3 P_{ir} - T n^2 \times 10^{-10}}{2T \times 10^{-10} \times n(N-n)}$$

For the third possibility, the following applies:

$$\frac{K_3 P_{ir} - Tn^2 \times 10^{-10}}{2} = \quad (11)$$

$$P(He \geq HPL, 2 \text{ failures not in } \underline{n}) \times P(2 \text{ failures not in } \underline{n})$$

P(He≧HPL, 2 failures not in n)×P(2 failures not in n) where P(2 failures not in n)=T×10$^{-10}$(N−n)$^2$ giving:

$$P(He \geq HPL, 2 \text{ failures not in } \underline{n}) = \frac{K_3 P_{ir} - Tn^2 \times 10^{-10}}{2T \times 10^{-10} \times n(N-n)^2} \quad (12)$$

The horizontal protection limit calculated on the horizontal component of the position $P_0$ is referred to as $HPL_0$.

The horizontal protection limit $HPL_0$ is determined so that:

$$P(He \geq HPL_0) = K_1 P_{ir} \quad (13)$$

The horizontal protection limit calculated on the horizontal component of the position $P_{00}$ is referred to as $HPL_{00}$. The formulae (5) and (12) gives different values for the integrity risk on the position $P_{00}$. To protect this position, it suffices to calculate a single horizontal protection limit $HPL_{00}$ corresponding to the smaller integrity risk calculated by the formulae (5) and (12). In practice, the coefficients $K_1$ and $K_2$ are calculated to obtain optimum values (i.e. values that are as close together as possible) from the formulae (5) and (12) and also (4) and (10). Other adjustment criteria could naturally be envisaged.

The horizontal protection limit $HPL_{00}$ is determined from formulae (5) and (12) in such a manner that:

$$P(He \geq HPL_{00}) = \min\left(K_2 \frac{P_{ir}}{2(N-n) \times 10^{-5}}; \frac{K_3 P_{ir} - Tn^2 \times 10^{-10}}{2T \times 10^{-10} \times (N-n)^2}\right) \quad (14)$$

The horizontal protection limit $HPL_{00}$ as calculated in this way on $P_{00}$ is then brought back to the position $P_0$ by calculating:

$$HPL_{00} = HPL_{00} + \text{distance}(P_0, P_{00}) \quad (15)$$

The horizontal protection limit calculated on the horizontal component of each position $P_{0i}$ is written $HPL_{0i}$.

The horizontal protection limits $HPL_{0i}$ are determined from formulae (4) and (10) in such a manner that:

$$P(He \geq HPL_{0i}) = \min\left(K_2 \frac{P_{ir}}{2n \times 10^{-5}}; \frac{K_3 P_{ir} - Tn^2 \times 10^{-10}}{2T \times 10^{-10} \times n(N-n)}\right) \quad (16)$$

The horizontal protection limits $HPL_{0i}$ as calculated in this way on $P_{00}$ are then brought back to the position $P_0$ by calculating:

$$HPL_{0i} = HPL_{0i} + \text{distance}(P_0, P_{0i}) \quad (17)$$

The overall horizontal protection limit HPL is then calculated by looking for the greatest previously-calculated protection limit, i.e.:

$$HPL = \text{MAX}\{HPL_0, HPL_{00}, HPL_{0i}\} \quad (18)$$

for i varying over the range 1 to N.

The method of calculation is identical for the vertical protection limit VPL.

The following is given by way of numerical example:

$P_{ir}$=9×10$^{-8}$/hour;
$K_1 P_{ir}$=4.12×10$^{-8}$/hour;
$K_2 P_{ir}$=1.9999×10$^{-8}$/hour;
$K_3 P_{ir}$=2.88065×10$^{-8}$/hour;
N=10;
n=6 (the satellites retained for calculating HPL are constituted, for example by 2.2, 2.3, 2.5, 2.6, 2.7, and 2.8; while the satellites retained for calculating VPL are for example 2.4, 2.5, 2.7, 2.8, 2.9, and 2.11); and
T=8.

Equation (12) gives $P(He \geq HPL_0)$=4.12×10$^{-8}$.
Equation (14) gives $P(He \geq HPL_{00})$=2.499×10$^{-4}$.
Equation (16) gives $P(He \geq HPL_{0i})$=1.666×10$^{-4}$.

Naturally, the invention is not limited to the embodiment described but covers any variant coming within the ambit of the invention as defined by the claims.

In particular, although the protection limits are brought back onto the main position $P_0$, it is possible to bring the protection limits back to the precise position $X_A$ by taking account of the distance $(P_0, X_A)$. When the system incorporates data other than satellite data, the precise or reference position is the main position.

Naturally, the invention is equally suitable for use with other satellite navigation systems such as the GALILEO system once it comes into operation.

It is also possible to envisage not calculating the secondary position $P_{00}$ nor the associated protection limits. The configurations of satellite breakdowns normally covered by calculating protection limits on said position are then processed by calculating protection limits on the second secondary positions.

The invention claimed is:

1. A method of locating a moving element by determining a reference position and at least one overall protection limit from data from a group of satellites in a constellation of satellites, the overall protection limit calculation comprising the step of calculating protection limits as a function of probabilities for the absence of failure in the constellation of satellites, and of failure in the constellation of satellites, the method comprising the steps of:
    from the group of satellites, selecting a subgroup comprising at least five satellites;
    calculating a main position from the data from a group of satellites;
    calculating secondary positions from the data from a subgroup of satellites by excluding date from one of the satellites when calculating each secondary position;
    calculating protection limits corresponding to the main and secondary positions while distinguishing whether the failure in the constellation does or does not affect the satellites taken into consideration; and
    calculating the overall protection limit from the reference position, the main position, the secondary positions, and the protection limits corresponding to the main and secondary positions.

2. A method according to claim 1, in which:
    for each failure of a data-supplying satellite of the group but not of the subgroup, the corresponding protection limit is calculated on one of the secondary positions;
    for failure of one data-supplying satellite of the subgroup, a corresponding protection limit is calculated on each secondary position;
    for failure of two data-providing satellites of the group but not of the subgroup, the protection limit is calculated on one of the secondary positions; and
    for failure of a data-supplying satellite of the group but not of the subgroup, and of a data-supplying satellite of the subgroup, a corresponding protection limit is calculated on each secondary position;

whereby failure of two data-supplying satellites of the subgroup is made negligible.

3. A method according to claim 1, comprising steps of calculating an additional secondary position from the subgroup of satellite, for failure of a data-supplying satellite of the group but not of the subgroup, the corresponding protection limit is calculated on the additional secondary position; and for failure of two data-supplying satellites of the group but not of the subgroup, the protection limit is calculated on the additional secondary position.

4. A method according to claim 1, in which the horizontal and vertical protection limits are calculated, the method comprising steps of selecting two different subgroups for calculating the horizontal and vertical protection limits.

* * * * *